July 26, 1966 W. H. OWEN 3,262,792
INVESTMENT MOLDING METHOD AND COMPOSITION
Filed Sept. 14, 1962 5 Sheets-Sheet 1

INVENTOR.
WILLIAM H. OWEN
BY
William C. Nealon
ATTORNEY

July 26, 1966 W. H. OWEN 3,262,792
INVESTMENT MOLDING METHOD AND COMPOSITION
Filed Sept. 14, 1962 5 Sheets-Sheet 3

INVENTOR.
WILLIAM H. OWEN
BY William C. Healm
ATTORNEY

July 26, 1966 W. H. OWEN 3,262,792
INVESTMENT MOLDING METHOD AND COMPOSITION
Filed Sept. 14, 1962 5 Sheets-Sheet 4

INVENTOR.
WILLIAM H. OWEN
BY William C. Wealer
ATTORNEY

July 26, 1966  W. H. OWEN  3,262,792
INVESTMENT MOLDING METHOD AND COMPOSITION
Filed Sept. 14, 1962  5 Sheets-Sheet 5

INVENTOR.
WILLIAM H. OWEN
BY
William C. Nealon
ATTORNEY

United States Patent Office

3,262,792
Patented July 26, 1966

3,262,792
INVESTMENT MOLDING METHOD AND
COMPOSITION
William H. Owen, Pittsburgh, Pa., assignor to Harbison-Walker Refractories Company, Pittsburgh, Pa., a corporation of Pennsylvania
Filed Sept. 14, 1962, Ser. No. 223,623
11 Claims. (Cl. 106—38.35)

This invention relates to the precision casting. In one embodiment, it relates to casting of metals by the so-called "lost wax" and like processes, and more particularly to improved investment molding methods and compositions therefor.

In more recent years, industrial precision casting operations have turned increasingly to the "lost wax" process. This process is particularly satisfactory for obtaining precision castings on an industrial scale in the manufacture of a large variety of metal and alloy parts, which are particularly difficult or economically unfeasible to fabricate by other manufacturing techniques. Exemplary of an area in which the "lost wax" method of precision casting has particular utility, is in the manufacture of small parts for high-speed jet engines.

Briefly, such a precision casting process is comprised of five steps—including preparation of a fusible pattern of a low-melting-point wax-type material; forming a refractory sheath about the wax pattern; removing the wax pattern from the refractory sheath by melting; casting molten metal into the wax-free refractory sheath; and finally, removing the sheath from the hardened casting.

One conventional method of fabricating the refractory sheath has been to prepare a hardenable refractory mixture from a blend of an investment binder such as colloidal silica, or various lower alkyl silicates such as ethyl silicate, water, plasticizers, catalyzers, and finely divided refractory aggregate. Prior practices have required considerable care in preparation of the binder mixture and the selection of a refractory aggregate in order to prevent premature gelation and setting of the mixture. Also, in some instances when improper handling and mixing techniques were used, considerable difficulty was encountered in removing the refractory form or sheath from the solidified metal casting. In some instances, the refractory sheath became so affixed to the casting as to require considerable force and banging to remove it which, in many instances, caused injury to the metal shape being cast. Particularly in the manufacture of such as aircraft jet engine turbine blades and buckets, even very minor imperfections are unacceptable and a casting having them is not usable.

Accordingly, it is an object of this invention to provide an improved method and composition for investment molding. It is another object of this invention to provide a molding composition for fabrication of a collapsible mold. It is yet another object of this invention to provide an improved method of forming a refractory sheath for use in investment molding techniques, which sheath is easily and rapidly removed from a cast shape with little danger of damage to a cast part.

Briefly, according to one aspect of the invention, an easily collapsible, readily removed, investment mold is provided. Such molds are fabricated from a mixture including a binder solution having a stringently controlled and minor amount of available silica therein, and very finely divided refractory aggregate.

Other objects and further features and advantages of the invention will be readily apparent, to those skilled in the art, from a study of the following detailed description with reference to the drawings.

Figure 1:
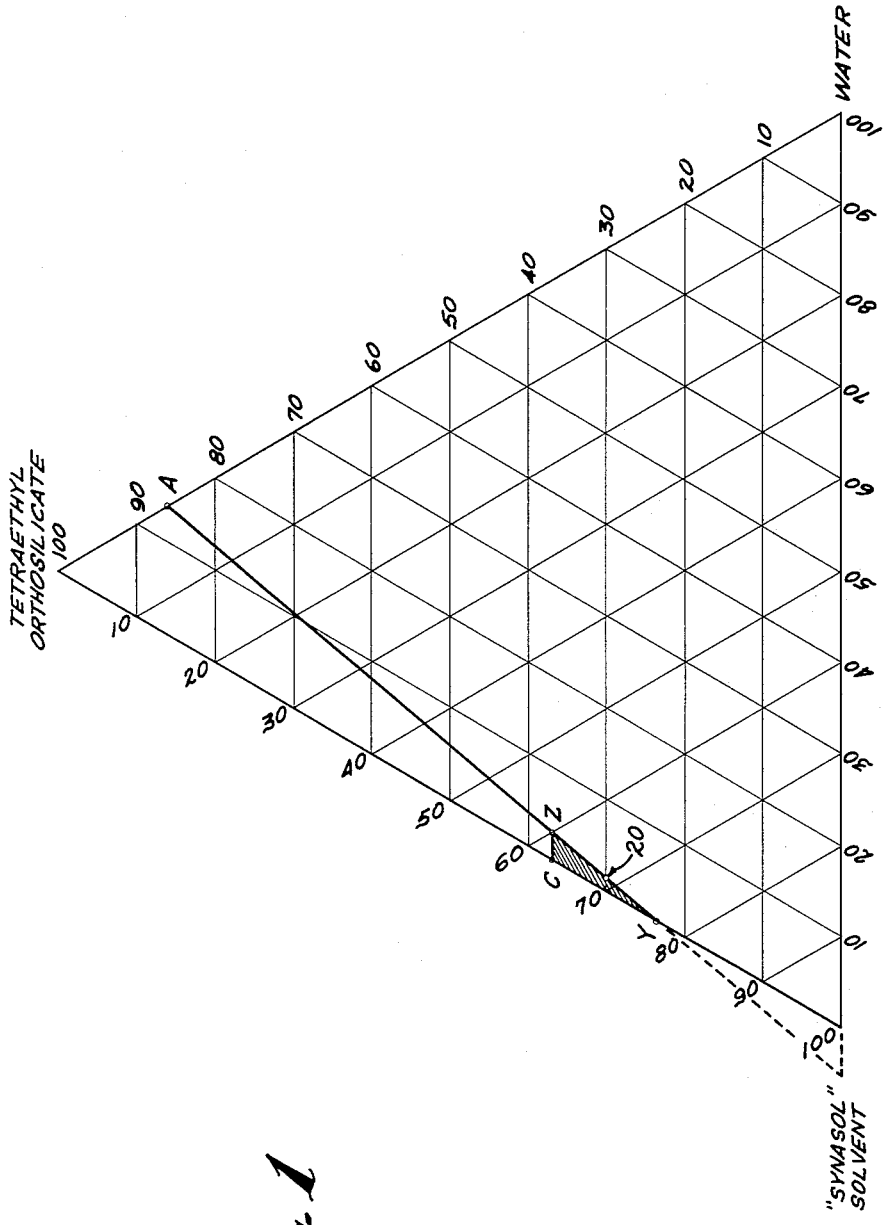
FIG. 1 is a ternary diagram illustrative of a preferred binder solution according to the concepts of this invention using tetraethyl orthosilicate.

The improved collapsible molds of this invention are made from a mixture of a silicate binder solution and a selected refractory material, such as mullite flour, in a stringently controlled combination. The binder solution is comprised of a silicate binder, a selected solvent, water and a catalyzer. In this combination, the amount of silicate binder, which is added, must provide not more than about 10 grams of $SiO_2$ per 100 ml. of the binder solution. There must be no water present in the solution beyond that necessary to completely hydrolyze the selected binder, and in the final analysis, must be critically controlled so as to provide a binder solution having substantially no free water after hydrolyzation of the binder.

The refractory flour, such as mullite flour, which is added to the binder solution above discussed, should include a minor amount of a selected plasticizer to provide a slurry having sufficient body to provide viscosity on the order of under 15 seconds Zahn No. 4 Cup Viscometer. A workable viscosity range is between 10 and 20 seconds. In a preferred embodiment, the mullite flour is substantially all −200 mesh and 94 parts thereof, by weight, is mixed with 3% each, by weight, very finely divided (−325 mesh) ball clay and Georgia kaolin. The clay and kaolin are the preferred plasticizers but other refractory clays or the like, well known to those skilled in the art, may be used. To obtain the 15 second viscosity, approximately 100 grams of the flour and plasticizer mixture is combined with about 33.3 ml. of the binder solution. The workable range of 10 to 20 seconds is obtained by varying the quantity of binder solution between about 31 and 35 ml. per 100 grams of refractory material.

A catalyzer should be included in the binder solution and may be such as hydrochloric acid in a quantity sufficient to reduce the pH of the binder solution to the order of 2. In any event, other acid materials may be used such as sulfuric acid, and in a quantity sufficient to maintain the pH of the binder solution below about 5. When the pH is above about 5, the stability of the solution is greatly reduced and premature gelatin usually results.

As noted above, there should be no more water in the binder solution beyond that necessary to completely hydrolyze the alkyl radical in the organic silicate binder. If there is an excess of water, the silica content of the organic silicate binder tends to hydrate, and results in a mold which is too strong and will not separate as easily as desired from a cast shape. Insufficient water, i.e. less than that required to just completely hydrolyze the alkyl group of the organic silicate, is acceptable in some instances; but, when a mold cast with a binder solution containing considerably less water than that required for complete hydrolyzation comes in contact with hot metal, there is carbonization with evolution of carbon dioxide gas bubbles, which results in pinholing of the metal casting. A workable lower range for the water is discussed below. To a like extent, the amount of available silica in the binder solution must be maintained below about 10 grams per 100 ml. of the binder solution.

Amounts greater than this result in a mold which is too strong, and which will not collapse after molten metal is cast therein.

The solvent which is chosen must be able to go into solution with the binder, and must be sufficiently miscible with water as to completely hydrolyze the organic radical in a selected binder silicate. The commercial solvent "Synasol" is particularly satisfactory. "Synasol" is 190 proof ethanol denatured with 1 gallon of methyl isobutyl ketone, one gallon of ethyl acetate (87%), and one gallon of aviation gasoline per 100 gallons.

FIG. 1 is a plot indicative of a preferred silicate binder solution according to the concepts of this invention using "Synasol" and tetraethyl orthosilicate (which has 28.8%, by weight, available $SiO_2$). Point "A" is indicative of a mixture of tetraethyl orthosilicate and just sufficient water for complete hydrolyzation. Thus, the line 10 between point "A" and the solvent 100%, point represents this volume relationship for mixture on the ternary digram.

Figure 3:
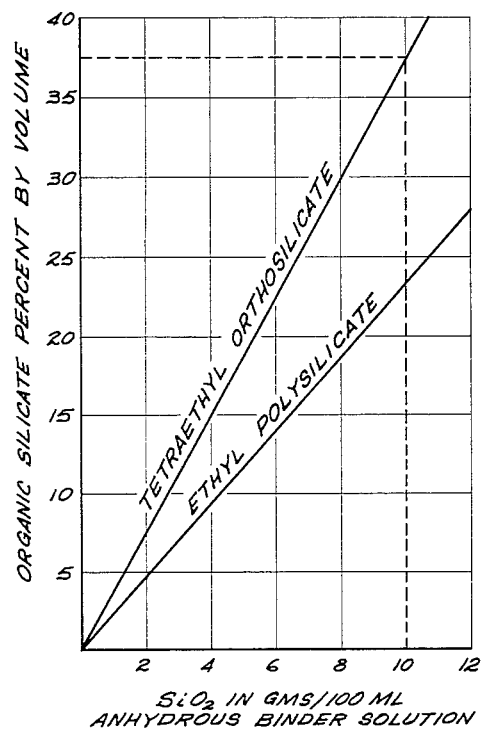
FIG. 3 is a plot of $SiO_2$ content for the organic silicate materials of FIGS. 1 and 2 when used according to the invention.

As noted above, the available silicate in a selected binder must be less than about 10%, by weight. Thus, referring to FIG. 3, it will be noted that not more than about 37.5%, by volume, of tetraethyl orthosilicate may be used in the binder solution to maintain the 10 grams per 100 ml. maximum $SiO_2$ content. This establishes line CZ in FIG. 1.

Preferred mixes according to the invention fall substantially along that portion of line 10 between points Y and Z. However, mixes to the left thereof within area CZY are usable; but, as line CY is approached along line CZ, and only about 62.5% of the necessary water is present, the mixes are less satisfactory.

Figure 2:
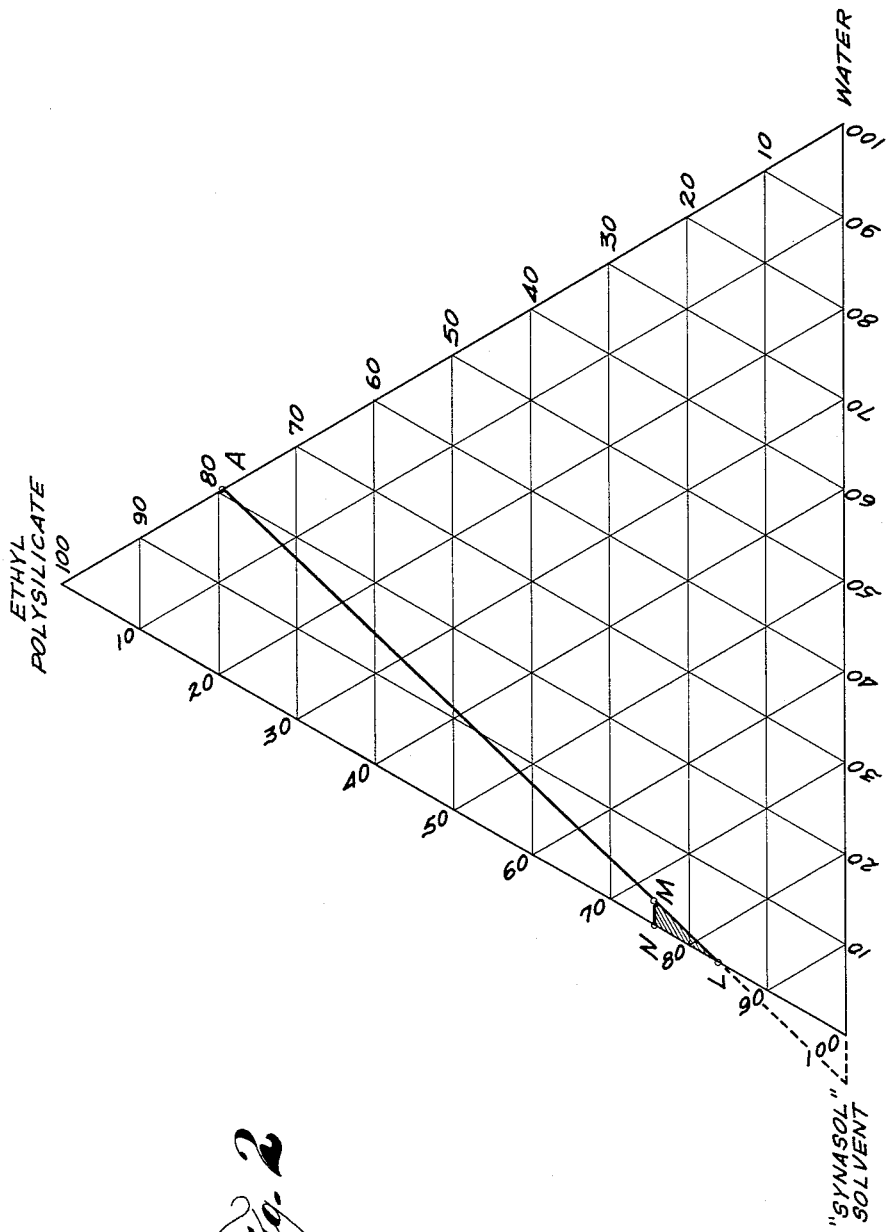
FIG. 2 is a ternary diagram illustrative of another preferred binder solution according to the concepts of this invention using ethyl polysilicate.

FIG. 2 is a plot similar to FIG. 1, in which ethyl polysilicate, having 40%, by weight, of available $SiO_2$ is used instead of the tetraethyl orthosilicate of FIG. 1. In this plot, the area LMN is the workable area, according to the concepts of this invention.

In a series of actual service tests according to the concepts of this invention, a wax pattern was fabricated to a desired shape. The wax pattern was thereafter degreased by washing with methylethyl ketone. A mixture of 30 parts, by volume, tetraethyl orthosilicate and 68 parts, by weight, of "Synasol" (point 20 in FIG. 1), providing an available $SiO_2$ content of 8.07 grams per 100 ml. was prepared. The mixing of the binder and solvent with commensurate hydrolyzation of the ethyl group in the binder resulted in an exothermic reaction, which caused the temperature of the mixture to rise from room temperature (about 72° F.) to 120° F. The mixture was thereafter allowed to cool to room temperature. Sufficient hydrochloric acid was then added to obtain a pH of 2. Next, 33.3 ml. of the binder solution was mixed with 100 grams of refractory material.

The refractory material consisted of 94 parts, by weight, −200 mesh mullite flour, 3 parts, by weight, of ball clay and 3 parts, by weight, of Georgia kaolin. The ball clay and kaolin were all −325 mesh. The mixture was stirred briskly until a uniform slurry resulted.

A wax pattern was dipped into the slurry and removed, the excess slurry being allowed to drain off the wax pattern. While still wet, the coated wax pattern was inserted in a fluidized bed of fine sand to obtain a roughened sandy coat thereover. Drying was then carried out from 15 to 20 minutes under ambient temperature conditions. The dipping, sanding and drying steps were repeated until a refractory shell of about 3/16 of an inch was deposited over the wax pattern.

The coated wax pattern was placed in a muffle furnace and shock heated to 1900° F., and retained therein until all of the wax had been removed. The pattern was then cooled to room temperature. The hollow refractory shell or form was then placed in a suitable support structure. In the tests, a vacuum chamber was in the support structure adjacent the exterior surface of the refractory form and there was approximately 4 inches, mercury, pressure drop across the shell. Molten metal at 2900° F. was poured into the mold. After a short set time, the shell and cast shape were removed and set on the floor. The shell was jarred by tapping of a worker's foot, and it collapsed from about the cast shape.

Figure 4:
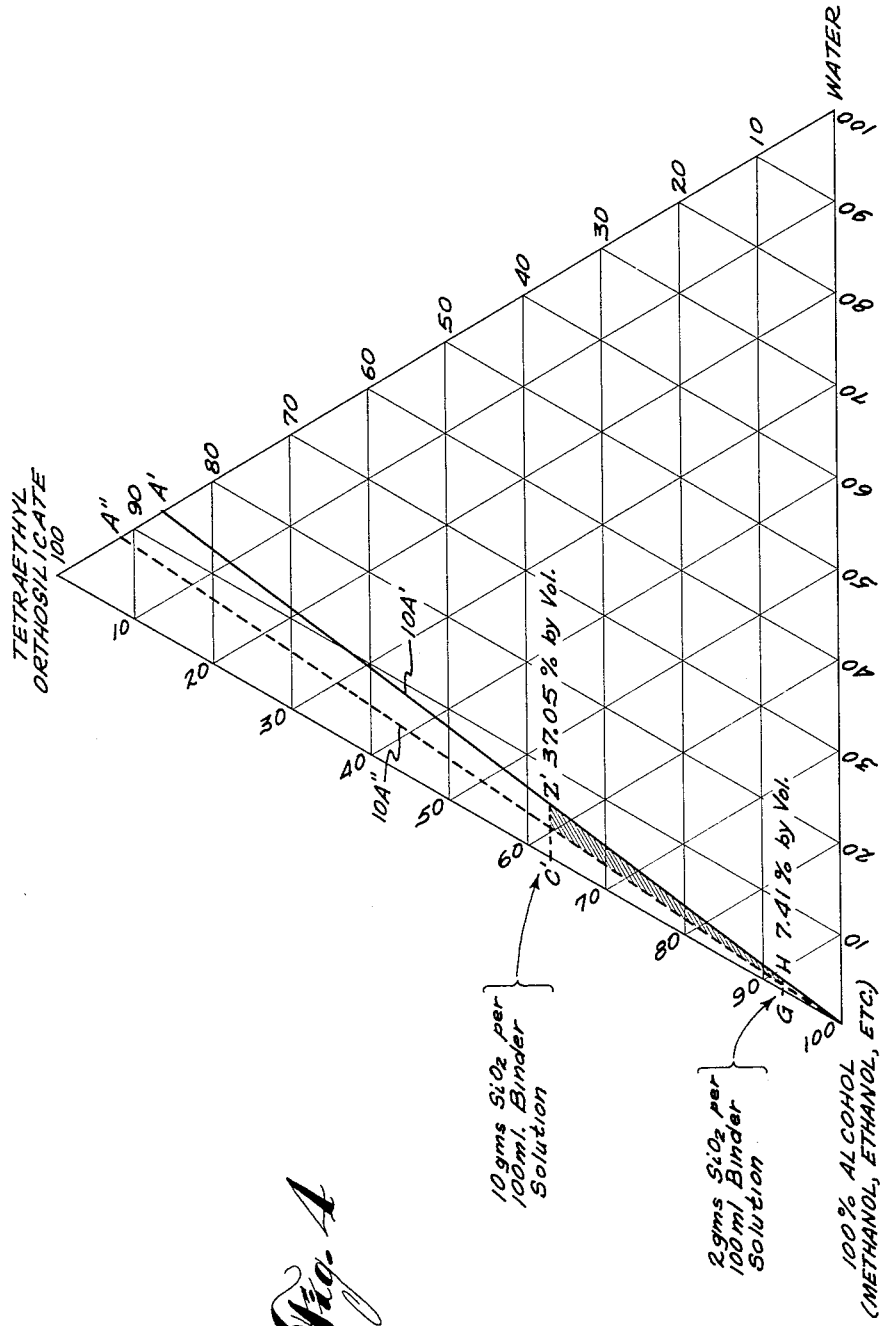
FIG. 4 is a ternary diagram similar to that of FIG. 1 using absolute alcohol.
Figure 5:
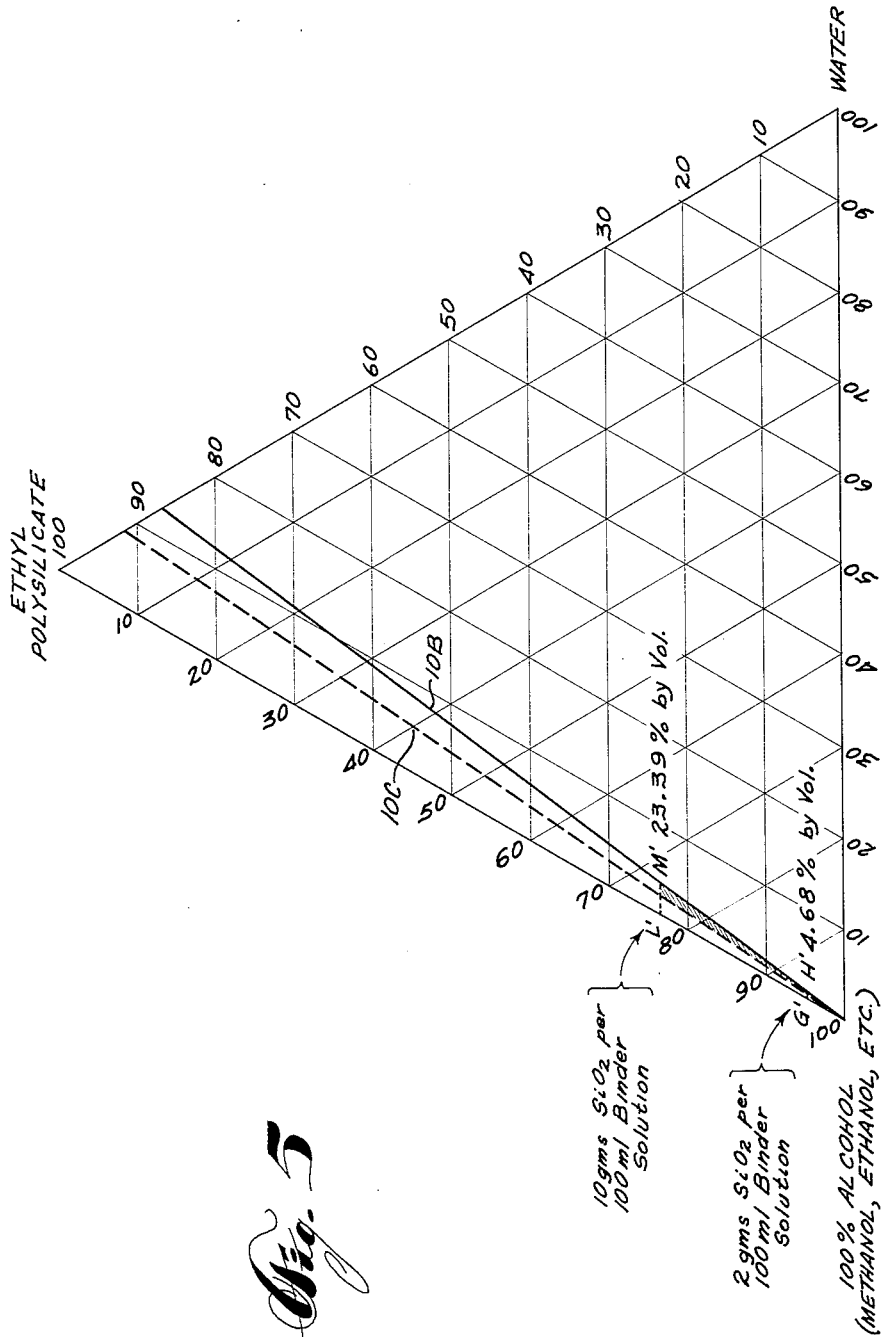
FIG. 5 is a ternary diagram similar to FIG. 2 using absolute alcohol.

FIGS. 1 and 2 are illustrative of workable mixes using "Synasol." Workable mixes using organic solvents, such as substantially 200 proof methanol, ethanol, propanol, etc., which otherwise fulfill the requirements of, ability to go into solution with a selected binder, and of sufficient miscibility with water as to allow for hydrolyzation of the organic radical of the selected binder silicate, are shown in FIGS. 4 and 5.

In the foregoing discussion, it has been pointed out that no more water should be present in the binder solution than that necessary for complete hydrolyzation of the organic portion of the binder silicate. However, workable binder solutions may be made, when there is at least about 60% of that water required for complete hydrolyzation of the organic portion of the silicate binder. As 60% is approached, less satisfactory mixes result. These mixes, however, are quite satisfactory for some less critical casting operations.

Referring to FIG. 4, with such 200 proof alcohols, a line 10A′ similar to line 10 in FIG. 1 is drawn between point A′ and the solvent 100% point. The line C′Z′, which is the 37.5% by volume ethyl orthosilicate line determining maximum therefore, is the same as line CZ in FIG. 1. The 60% minimum quantity of water for hydrolyzation of the ethyl radical of the silicate binder, line 10A″, is plotted to the left of line 10A′. The desired minimum $SiO_2$ is determined from FIG. 3 and plotted in FIG. 4 as line GH. As a practical matter, 2 grams of $SiO_2$ per 100 ml. is the lowest useable, and provides a very weak mold having somewhat limited utility. The workable area is thus defined between intersecting lines 10A″, 10A′, C′Z′ and GH.

In FIG. 5, lines 10B and 10C define the area of 60% to 100% of the water just necessary for complete hydrolyzation of the ethyl polysilicate, and the area defined by their intersection with lines L′M′ and G′H′ encompasses the workable mixes using polyethyl silicate.

Having thus described the invention in detail and with sufficient particularity as to enable those skilled in the art to practice it, what I desire to have protected by Letters Patent is set forth in the following claims.

I claim:
1. An investment molding medium consisting essentially of a mixture of a binder solution, and a selected refractory material:
   (a) the refractory material being a mixture of about 100 parts, by weight, of −200 mesh mullite flour, and a minor amount of a selected clay plasticizer in a quantity to obtain a viscosity in the range 10 to 20 seconds Zahn No. 4 Cup Viscometer;
   (b) the binder solution being a mixture of the following four ingredients:
      (i) a lower alkyl silicate selected from the group ethyl polysilicate and tetraethyl orthosilicate,
      (ii) an organic solvent selected from the group 190 to 200 proof methanol, ethanol, and propanol,
      (iii) water, and
      (iv) an acid catalyzer selected from the group hydrochloric acid and sulfuric acid,
      the proportions of the foregoing four binder solution constituents, based on 100 milliliters of binder solution, being substantially as follows:
         (i) lower alkyl silicate providing 2 to 10 grams of available $SiO_2$,
         (ii) water hydrolyzing 60 to 100% of the alkyl silicate,
         (iii) acid to obtain a pH of less than 5,
         (iv) the remainder of the 100 milliliters being the organic solvent;

(c) from 31 to 35 milliliters of binder solution per 100 grams of refractory and clay plasticizer mixture.

2. The investment molding medium of claim 1 in which the refractory material is a mixture of mullite flour and a clay plasticizer.

3. The investment molding medium of claim 2 in which the refractory material is a mixture of about 94 parts mullite flour, about 3 parts —325 mesh Georgia kaolin and about 3 parts —325 mesh ball clay.

4. The investment molding medium of claim 1 in which the selected solvent is 190 proof alcohol which is fluid under ambient conditions of temperature and pressure.

5. The investment molding medium of claim 1 in which the pH is about 2.

6. A binder solution for investment molding and the like consisting essentially of a mixture of solvent, tetraethyl orthosilicate and water within the area defined by the lines intersecting at the points CZY in the ternary diagram of FIG. 1.

7. A binder solution for investment molding and the like consisting essentially of a mixture of solvent, ethyl polysilicate and water within the area defined by the lines intersecting at the points LMN in the ternary diagram of FIG. 2.

8. A binder solution for investment molding and the like consisting essentially of a mixture of alcohol, tetraethyl orthosilicate and water within the hatched area defined by the intersection of the lines Z'H, H–G, G–A'' and C'–Z' in the ternary diagram of FIG. 4.

9. A binder solution for investment molding and the like consisting essentially of a mixture of alcohol, ethyl poly silicate and water within the hatched area defined by the intersection of the lines 10B, 10C, L'–M' and G'–H' as shown in the ternary diagram of FIG. 5.

10. In a method of preparing investment molding medium from a mixture of a binder solution and refractory and in which the binder solution includes a lower alkyl silicate binder, a selected organic solvent and water, the improvement comprising using a lower alkyl silicate binder providing an $SiO_2$ content between 2 and 10 grams per 100 milliliters of binder solution, the alkyl radical of the silicate binder being between 60 and 100% hydrolyzed, whereby to provide an easily destructible mold when mixed with refractory and allowed to set.

11. In a method of preparing investment molding medium from a mixture of a binder solution and refractory and in which the binder solution includes an ethyl substituted lower alkyl silicate binder, a selected alcohol and water, the improvement comprising using a lower alkyl silicate binder providing an $SiO_2$ content between 2 and 10 grams per 100 milliliters of binder solution, the alkyl radical of the silicate binder being between 60 and 100% hydrolyzed, whereby to provide an easily destructible mold when mixed with refractory and allowed to set.

References Cited by the Examiner

UNITED STATES PATENTS

| | | | |
|---|---|---|---|
| 1,909,008 | 5/1933 | Prange | 106—38.3 |
| 2,027,932 | 1/1936 | Ray | 106—38.2 XR |
| 2,230,206 | 1/1941 | Sproat | 106—11 |
| 2,318,753 | 5/1943 | Carter | 106—73 |
| 2,504,133 | 4/1950 | Kerlin | 22—217 |
| 2,603,570 | 7/1952 | Bole | 106—41 |
| 2,680,890 | 6/1954 | Moore et al. | 22—113.1 |
| 2,749,586 | 6/1956 | Kohl et al. | 22—194 |
| 2,795,022 | 6/1957 | Shaw | 22—192 |
| 2,811,760 | 11/1957 | Shaw | 22—192 |
| 2,829,060 | 1/1958 | Emblem et al. | 106—38.35 |
| 2,911,310 | 11/1959 | Shaw | 106—38.2 |
| 2,945,273 | 7/1960 | Herzmark et al. | 22—193 |
| 3,022,555 | 2/1962 | Shaw | 22—192 |
| 3,085,021 | 4/1963 | Konrad | 106—84 |
| 3,146,252 | 8/1964 | Emblem et al. | 106—38.35 XR |

ALEXANDER H. BRODMERKEL, *Primary Examiner.*

MORRIS LIEBMAN, *Examiner.*

J. B. EVANS, *Assistant Examiner.*